US009224368B2

(12) United States Patent
Schpok

(10) Patent No.: US 9,224,368 B2
(45) Date of Patent: Dec. 29, 2015

(54) MERGING THREE-DIMENSIONAL MODELS OF VARYING RESOLUTION

(71) Applicant: Google Inc., Mountain View, CA (US)

(72) Inventor: Joshua Sam Schpok, Milipitas, CA (US)

(73) Assignee: Google Inc., Mountain View, CA (US)

(*) Notice: Subject to any disclaimer, the term of this patent is extended or adjusted under 35 U.S.C. 154(b) by 326 days.

(21) Appl. No.: 13/771,695

(22) Filed: Feb. 20, 2013

(65) Prior Publication Data

US 2014/0232717 A1   Aug. 21, 2014

(51) Int. Cl.
| | |
|---|---|
| *G06T 17/00* | (2006.01) |
| *G06T 15/00* | (2011.01) |
| *G09G 5/377* | (2006.01) |
| *G06T 17/05* | (2011.01) |
| *G01S 17/89* | (2006.01) |

(52) U.S. Cl.
CPC .............. *G09G 5/377* (2013.01); *G01S 17/89* (2013.01); *G06T 17/05* (2013.01)

(58) Field of Classification Search
CPC ........ G06T 15/005; G06T 19/00; G06T 17/20
USPC .................................................. 345/418–420
See application file for complete search history.

(56) References Cited

U.S. PATENT DOCUMENTS

| | | | | |
|---|---|---|---|---|
| 5,841,441 | A * | 11/1998 | Smith | 345/587 |
| 5,889,582 | A * | 3/1999 | Wong et al. | 356/4.01 |
| 8,666,146 | B1 * | 3/2014 | Smolic et al. | 382/154 |
| 8,830,309 | B2 * | 9/2014 | Rohaly et al. | 348/66 |
| 2004/0153444 | A1 * | 8/2004 | Senders et al. | 707/3 |
| 2010/0036518 | A1 * | 2/2010 | Funk et al. | 700/121 |
| 2012/0081357 | A1 * | 4/2012 | Habbecke et al. | 345/419 |
| 2012/0194516 | A1 * | 8/2012 | Newcombe et al. | 345/420 |

OTHER PUBLICATIONS

Title: Reconstructing Textured CAD Model of Urban Environment Using Vehicle-Borne Laser Range Scanners and Line Cameras Author: Zhao Date: 2001.*
Curless et al., "A Volumetric Method for Building Complex Models from Range Images", *SIGGRAPH* '96, 23$^{rd}$ International Conference on Gomputer Graphics and Interactive Techniques, New Orleans, Louisiana, Aug. 4-9, 1996, 10 pps.

* cited by examiner

*Primary Examiner* — Phi Hoang
*Assistant Examiner* — Yi Yang
(74) *Attorney, Agent, or Firm* — Dority & Manning, P.A.

(57) ABSTRACT

Systems and methods for merging three-dimensional models, such as a three-dimensional range sensor-based model and a three-dimensional camera-based model, are provided. According to aspects of the present disclosure, an enhanced volumetric merging technique can be used to merge the three-dimensional models. A plurality of voxels can be constructed for a three-dimensional space. A first distance field can be propagated based on the range sensor-based model in an extended margin between the range sensor-based model and a range sensor viewpoint. A second distance field can be propagated based on the camera-based model for voxels in the extended margin. A cumulative distance field can be determined based at least in part on the first field and the second distance field. The merged three-dimensional model can be constructed from the cumulative distance field using, for instance, a suitable meshing algorithm.

14 Claims, 5 Drawing Sheets

MERGING THREE-DIMENSIONAL MODELS OF VARYING RESOLUTION

FIELD

The present disclosure relates generally to three-dimensional modeling and more particularly, to merging three-dimensional models.

BACKGROUND

Three-dimensional models can be generated from data acquired by a range sensor, such as a laser range sensor. For instance, a three-dimensional model of a streetscape can be generated from data points representative of distances to a surface taken from a range sensor from a perspective at or near the ground level. The data points associated with a surface can be used to construct a polygon mesh (e.g. a triangle mesh) modeling the surface. Three-dimensional models can also be generated using images captured by a camera. For instance, aerial images captured, for instance from an aircraft, can be used to construct three-dimensional models of a geographic area using stereo matching techniques.

To provide a more accurate and/or complete model of a geographic area, such as a streetscape, it can be desirable to merge a three-dimensional model generated from data acquired by a range sensor (i.e. a range sensor-based model) and a three-dimensional model reconstructed from camera imagery, such as aerial imagery, (i.e. a camera-based model). This can improve the resolution of the three-dimensional model of the geographic area and can fill in the missing data of either the range sensor-based model or the camera-based model.

Merging a range sensor-based model and a camera-based model can present difficulties. For instance, inconsistencies between the range sensor-based model and the camera-based model may need to be reconciled. In addition, resolution disparity typically exists between a range sensor-based model and a camera-based model. Moreover, the bias of the merged three-dimensional model to the range sensor-based model or to the camera-based model may need to be controlled.

SUMMARY

Aspects and advantages of the invention will be set forth in part in the following description, or may be obvious from the description, or may be learned through practice of the invention.

One exemplary aspect of the present disclosure is directed to computer-implemented method for constructing a merged three-dimensional model. The method includes determining, with a processing device, a first distance value for each of a plurality of voxels in an extended margin. The first distance value is determined based on a range sensor-based model constructed from range sensor data. The extended margin extends between the range sensor-based model and a range sensor viewpoint associated with the range sensor-based model. The method further includes determining, with the processing device, a second distance value for each of the plurality of voxels in the extended margin based upon a three-dimensional camera-based model constructed from imagery captured by a camera. The method further includes determining, with the processing device, a cumulative distance value for each of the plurality of voxels in the extended margin. The cumulative distance value for a respective voxel in the plurality of voxels is determined based at least in part on the first distance value associated with the respective voxel and the second distance value associated with the respective voxel. The method further includes constructing, with the processing device, the merged three-dimensional model based at least in part on the cumulative distance value for each of the plurality of voxels.

Other exemplary aspects of the present disclosure are directed to systems, apparatus, non-transitory computer-readable media, user interfaces and devices for merging three-dimensional models.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
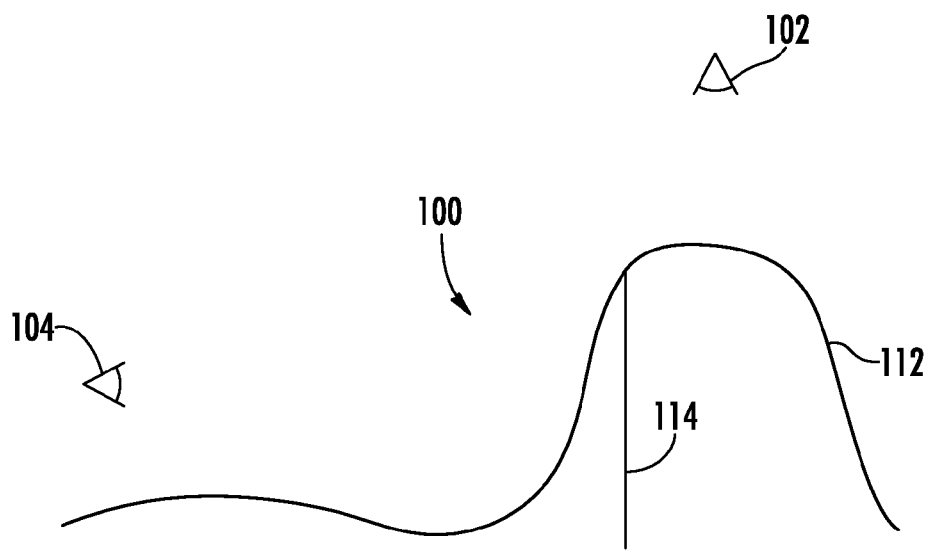
FIG. 1 depicts an exemplary camera-based model and an exemplary range sensor-based model to be merged into a three-dimensional model of a scene according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to merging three-dimensional models, such as a three-dimensional range sensor-based model and a three-dimensional camera-based model. A range sensor-based model is a three-dimensional model constructed from range sensor data collected by a range sensor, such as a laser range sensor or other suitable sensor. A camera-based model is a three-dimensional model constructed from imagery captured by a camera, such as a model constructed from aerial imagery using stereo matching techniques. The range sensor-based model and the camera-based model can be merged to provide a more complete and/or accurate three-dimensional model of a scene, such as a streetscape. The merged three-dimensional model can be provided as part of a geographic information system that allows a user to navigate the three-dimensional model to view geographic areas of interest.

According to aspects of the present disclosure, an enhanced volumetric merging technique can be used to merge the three-dimensional models. The enhanced merging technique can accommodate observation and resolution disparities between the range sensor-based model and the camera-based model. In addition, the enhanced merging technique can take advantage of the range sensor data conveying not only the presence of a surface, but also the absence of surfaces or structures between the surface and the range sensor source to construct a more accurate merged three-dimensional model.

More particularly, a plurality of voxels can be constructed for a three-dimensional space. Because the camera-based model can have a much lower resolution than the range sensor-based model, the plurality of voxels can have a resolution that is associated with the resolution of the range sensor-based model. This provides for sampling of the camera-based model at the resolution of the range sensor-based model during merging of the three-dimensional models, providing smoother transitions between range sensor-based models and camera-based models of varying resolutions.

A first distance field can be propagated based on the range sensor-based model. The first distance field can provide a first weighted distance value for voxels in an extended margin between the range sensor-based model and a range sensor viewpoint (e.g. the viewpoint of the range sensor that collected the data used to generate the range sensor-based model). For instance, the first distance field can be propagated for voxels that intersect one or more rays extending between the range sensor-based model and the range sensor viewpoint.

A second distance field can be propagated based on the camera-based model. Instead of propagating the second distance field a narrow margin around the camera-based model as is typical in merging techniques involving camera-based models, the second distance field can provide a second weighted distance value for voxels in the extended margin between the range sensor-based model and the range sensor viewpoint. This can be performed with confidence that if any object existed between the range sensor viewpoint and the range sensor-based model, it would have been observed by the range sensor. As a result, the range sensor-based model can be used to "carve space" in the camera-based model where none was observed in the range sensor-based model.

A cumulative distance field can be determined for the voxels based at least in part on the first weighted distance values provided by the first distance field and the second weighted distance values provided by the second distance field. Confidence weights associated with the first weighted distance values can be greater than confidence weights associated with the second weighted distance values, such as at least ten times greater than the confidence weights associated with the second weighted distance values. This allows the merged three-dimensional model to be more biased towards the higher resolution and typically more accurate range sensor-based model. The camera-based model can be used to fill in gaps in the range sensor-based model, such as the tops of trees, buildings, or building awnings. Once the cumulative distance field has been determined, a meshing algorithm, such as a dual marching cubes meshing algorithm or other suitable meshing algorithm, can then be used to construct the merged three-dimensional model from the cumulative distance field.

With reference now to the figures, exemplary embodiments of the present disclosure will now be discussed in detail. The figures illustrate two-dimensional representations for purposes illustration and discussion. One of ordinary skill in the art, using the disclosures provided herein, will recognize that the two dimensional representations can be representative of three-dimensional elements.

FIG. 1 depicts an exemplary camera-based model 112 and an exemplary range sensor-based model 114 of a scene 100, such as a streetscape. The camera-based model 112 and the range sensor-based model 114 can provide a representation of a building and other features in a streetscape. The camera-based model 112 can be constructed from images captured by a camera. The range sensor-based model 114 can be constructed from data collected by a range sensor, such as a laser range sensor. As will be discussed in more detail below, the camera-based model 112 can be associated with a camera viewpoint 102. The range sensor-based model can be associated with a range sensor viewpoint 104.

The camera-based model 112 can be a stereo reconstruction generated from aerial or satellite imagery of a geographic area. The imagery can be taken by overhead cameras, such as from an aircraft, at various oblique or nadir perspectives. In the imagery, features are detected and correlated with one another. The points can be used to determine a stereo mesh from the imagery. In this way, a three-dimensional model can be determined from two-dimensional imagery. The camera-based model 112 can be represented by any suitable representation or collection of data that is indicative of the location of the surfaces of the camera-based model 112. For instance, the camera-based model 112 can be represented as a depth map, height field, closed mesh, signed distance field, or any other suitable type of representation.

The camera-based model 112 can have associated perspective information. For instance, the camera-based model 112 can be reconstructed from a perspective of a camera viewpoint 102. In one example, a camera-based model 112 can be determined using stereo reconstruction of two or more images projected back to the particular camera viewpoint 102. In another example, a camera-based model 112 can be determined by merging two or more camera-based models constructed from imagery captured by a camera. The camera viewpoint 102 in this particular embodiment can be determined based on the perspectives of the merged camera-based models used to generate the camera-based model 112. The camera viewpoint 102 can be modeled as a virtual camera that includes all the information needed to specify a perspective or viewpoint for the camera-based model 112. For instance, the camera viewpoint 102 can have a corresponding virtual camera model providing position, orientation, and field of view for the virtual camera.

The range sensor-based model 114 can be constructed from data acquired by a range sensor, such as a laser range sensor. For instance, the range sensor-based model 114 can be constructed from data collected by a light detection and ranging (LIDAR) device. The range sensor-based model 114 can be constructed by connecting the data points observed by the range sensor to generate a mesh. For instance, the observed data points can serve as vertices of triangles or other polygons in the mesh. Similar to the camera-based model, the range sensor-based model 112 can be represented by any suitable representation or collection of data that is indicative of the location of the surfaces of the range sensor-based model 112. For instance, the range sensor-based model 112 can be represented as a depth map, height field, closed mesh, signed distance field, or any other suitable type of representation.

The range sensor-based model 114 can also have associated perspective information. The associated perspective can be the range sensor viewpoint 104 indicative of the viewpoint from which the range sensor data used to construct the range sensor-based model 114 was collected. In one embodiment, the range sensor-based model 114 is associated with a perspective of a range sensor viewpoint 104 at or near the ground level. The range sensor viewpoint 102 can be modeled as a virtual camera that includes all the information needed to specify a perspective or viewpoint for the range sensor-based model 112. For instance, the range sensor viewpoint 104 can have a corresponding virtual camera model providing position, orientation, and field of view for the virtual camera.

The resolution of the camera-based model 112 can be much less than the resolution of the range sensor-based model 114. For instance, the camera-based model 112 can be constructed from fewer and more spaced a part data points than the range sensor-based model 114. The range sensor-based model 114 can provide a more accurate representation of the scene 100 as a result of the higher resolution of the range sensor-based model 114 and as a result of the range sensor data used to construct the range sensor-based model 114 being collected from a perspective that is much closer to the scene 100. In addition, the range sensor-based model 114 conveys not only the presence of a surface in the scene 100, but also the absence of any surfaces between the surface and the range sensor viewpoint 104 in the scene 100.

Aspects of the present disclosure are directed to merging the camera-based model 112 with the range sensor-based model 114 to generate a merged three-dimensional model. The merged three-dimensional model can provide a more accurate representation of the scene 100. The present disclosure will be discussed with reference to merging a single camera-based model 112 with a single range sensor-based model 114. However, those of ordinary skill in the art, using the disclosures provided herein, will understand that the techniques disclosed herein can be used to merge one or more camera-based models with one or more range sensor-based models without deviating from the scope of the present disclosure.

Figure 2:
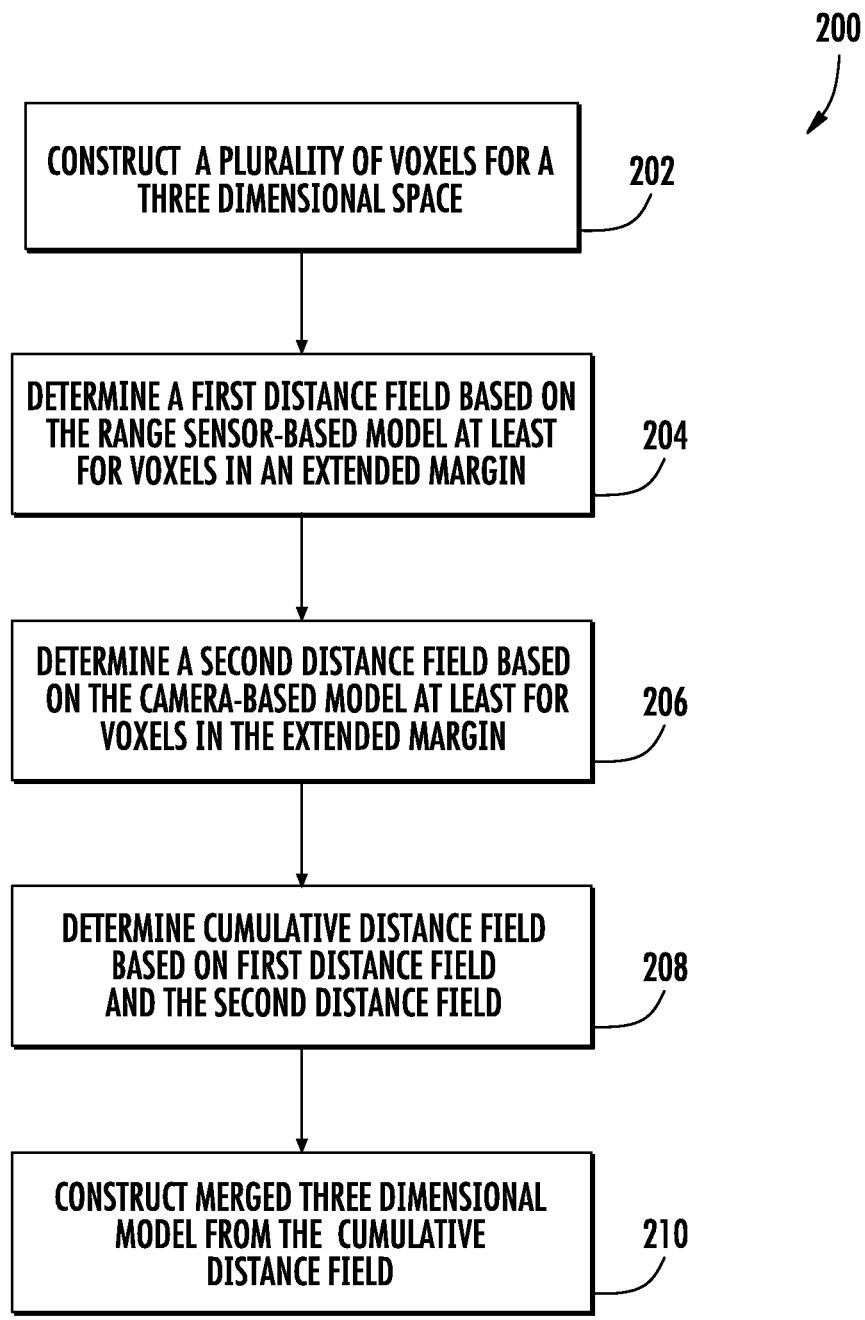
FIG. 2 depicts a flow diagram of an exemplary method for merging three-dimensional models according to an exemplary embodiment of the present disclosure.

FIG. 2 depicts a flow diagram of an exemplary method (200) for merging three-dimensional models according to an exemplary embodiment of the present disclosure. The method can be implemented by any suitable computing system, such as the system 400 depicted in FIG. 8. In addition, although FIG. 2 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined and/or adapted in various ways.

At (202), a plurality of voxels are constructed for a three-dimensional space associated with the scene 100. The plurality of voxels can be associated with distance values for one or more signed distance fields used to merge the camera-based model 112 and the range sensor-based model 114. The plurality of voxels can be constructed as a voxel grid associated with a specified resolution. As the resolution of the voxel grid increases, the spacing between the voxels in the voxel grid can become smaller. In one embodiment, the voxel grid can have a resolution associated with the resolution of the range sensor-based model 114. This can provide for sampling of the typically lower resolution camera-based model 112 at the resolution associated with the range sensor-based model 114, reducing anomalies caused by the disparate resolutions of the camera-based model 112 and the range sensor-based model 114.

Figure 3:
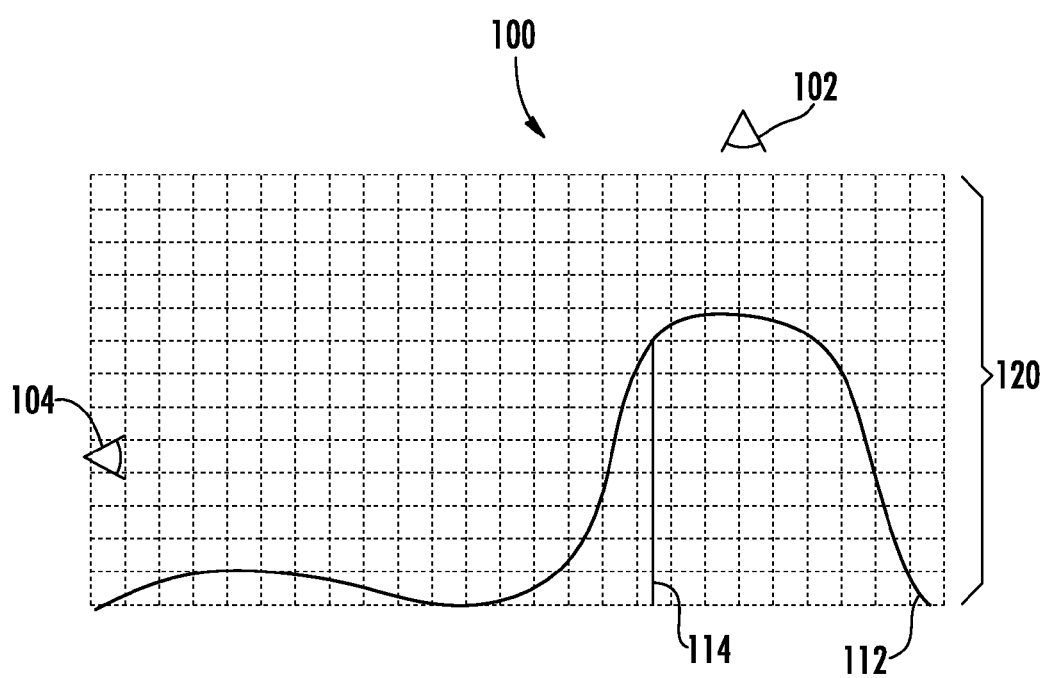
FIG. 3 depicts a voxel grid for a three-dimensional space associated with the scene of FIG. 1.

FIG. 3 depicts an exemplary voxel grid 120. Voxels can be located at the intersection of the lines representing the voxel grid 120 in FIG. 3. Each voxel can have a discrete position in the three-dimensional space associated with the scene 100. The voxels can be regularly spaced across the three-dimensional environment. According to exemplary aspects of the present disclosure, each voxel can be evaluated independently to determine whether the voxel is to be used to construct the merged three-dimensional model.

The voxels of the voxel grid 120 shown in FIG. 3 are shown as being regularly spaced with continuous resolution. However, those of ordinary skill in the art, using the disclosures provided herein, will recognize that other embodiments can involve an adaptive resolution. With an adaptive resolution, instead of sampling at regularly spaced voxels, the voxels can be more dense close to a surface of a model and less dense away from the surface. This embodiment can provide more detail with less memory usage.

Referring back to FIG. 2 at (204), the method determines a first distance field based on the range sensor-based model 114. The first distance field can provide a signed weighted distance value for certain voxels in the voxel grid. The signed weighted distance value can include a first distance value as well as a first confidence weight associated with the first distance value. A distance value that is positive indicates that the voxel is located below (or within) the range sensor-based model 114. A distance value that is negative indicates that the voxel is located above (or outside) the range sensor-based model 114.

In particular, the first distance field can be propagated for voxels located within an extended margin. The extended margin refers to the space between the range sensor-based model 114 and the range sensor viewpoint 104. A voxel can be considered to be within the extended margin if a ray extending between a surface of the range sensor-based model 114 and the range sensor viewpoint intersects the voxel.

Figure 4:
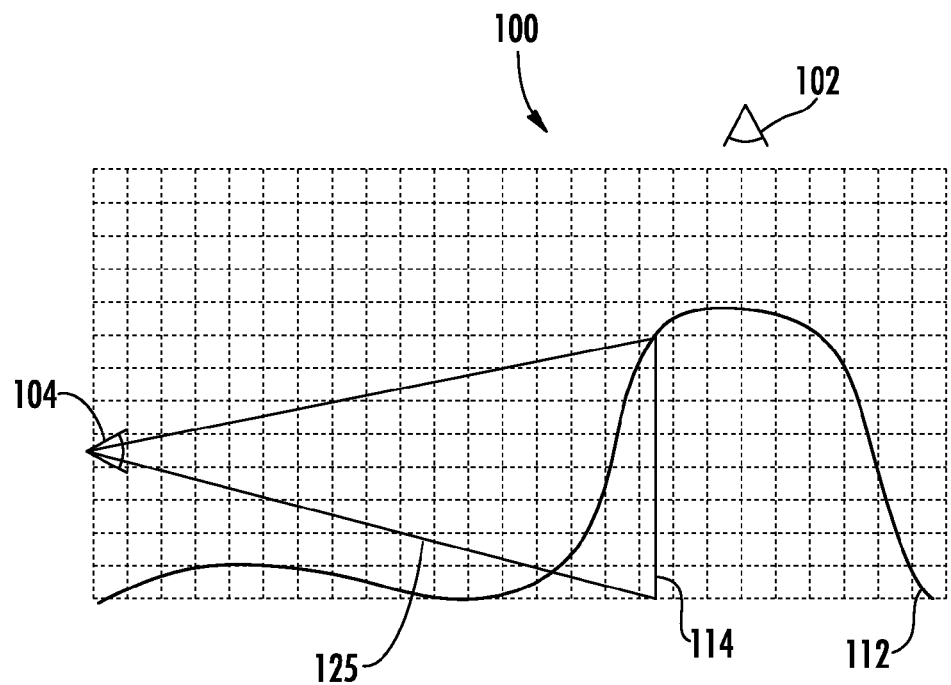
FIG. 4 depicts an extended margin extending between the range sensor-based model and a range sensor viewpoint associated with the range sensor-based model.

FIG. 4 depicts a representation of an exemplary extended margin 125 for the scene 100. As shown, the extended margin 125 includes voxels that are intersected by a ray extending between the range sensor viewpoint 104 and the range sensor-based model 114. Propagating distance fields for voxels in the extended margin can take advantage of the knowledge of absence of structures or objects between the range sensor-based model 114 and the range sensor viewpoint 104 to carve out objects in the camera-based model 112 located within the extended margin 125 when constructing the merged three-dimensional model.

A first distance value is determined for respective voxels in the extended margin 125. The first distance value represents the distance between the respective voxel and the range sensor-based model 114 along a perspective associated with the range sensor-based model 114. In particular, the first distance value for the respective voxel can be measured along a ray from the respective voxel directly towards or directly away from the range sensor viewpoint 104.

Figure 5:
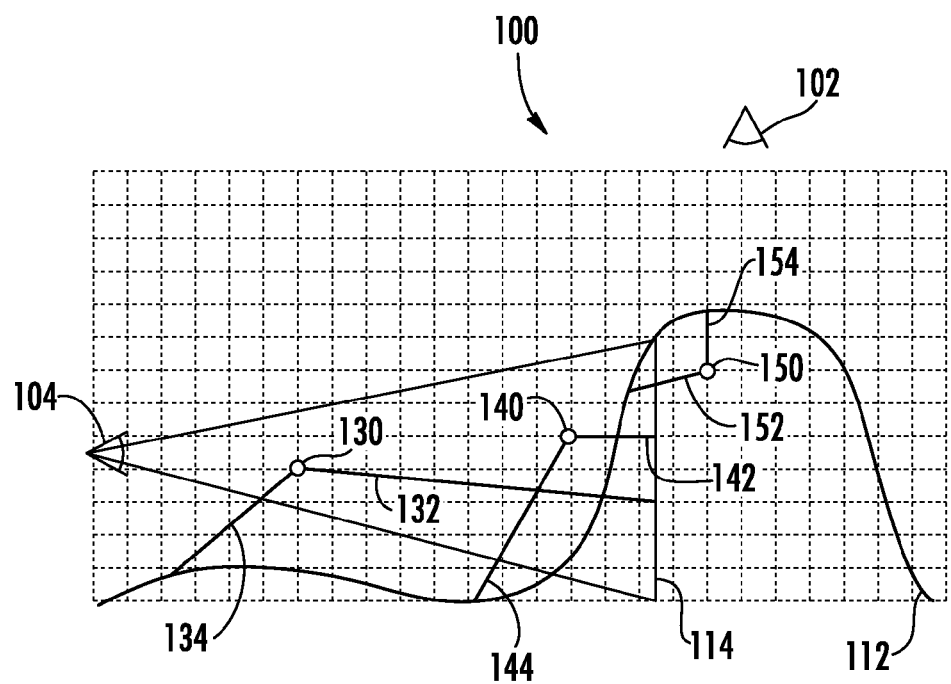
FIG. 5 depicts determining distance fields for voxels in the scene based on the range sensor-based model and the camera-based model according to an exemplary embodiment of the present disclosure.

For instance, FIG. 5 depicts the exemplary determination of first distance values for exemplary respective voxels 130 and 140 located within the extended margin 125. In particular, a first distance value 132 can be determined for voxel 130. The first distance value 132 is the distance between the voxel 130 and the range sensor-based model 114 along a ray extending directly away from the range sensor viewpoint 104. The first distance value 132 can be a negative distance value because the voxel 130 is located outside the range sensor-based model 114. A first distance value 142 can be determined for voxel 140. The first distance value 142 is the distance between the voxel 140 and the range sensor-based model 114 along a ray extending directly away from the range sensor viewpoint 104. The first distance value 142 can be a negative distance value because the voxel 140 is located outside the range sensor-based model 114.

First confidence weights can also be determined for the respective voxels. The first confidence weights can be used in the determination of a cumulative distance field as will be discussed in more detail below. The first confidence weights can be determined in any suitable manner. In certain embodiments, the first confidence weights should be greater than any confidence weights associated with a distance field determined based on the camera-based model 112, such as at least ten times greater than any confidence weights associated with a distance field determined based on the camera-based model 112. In this way, the merged three-dimensional model can be biased towards the more accurate and higher resolution range sensor-based model 114.

Figure 6:
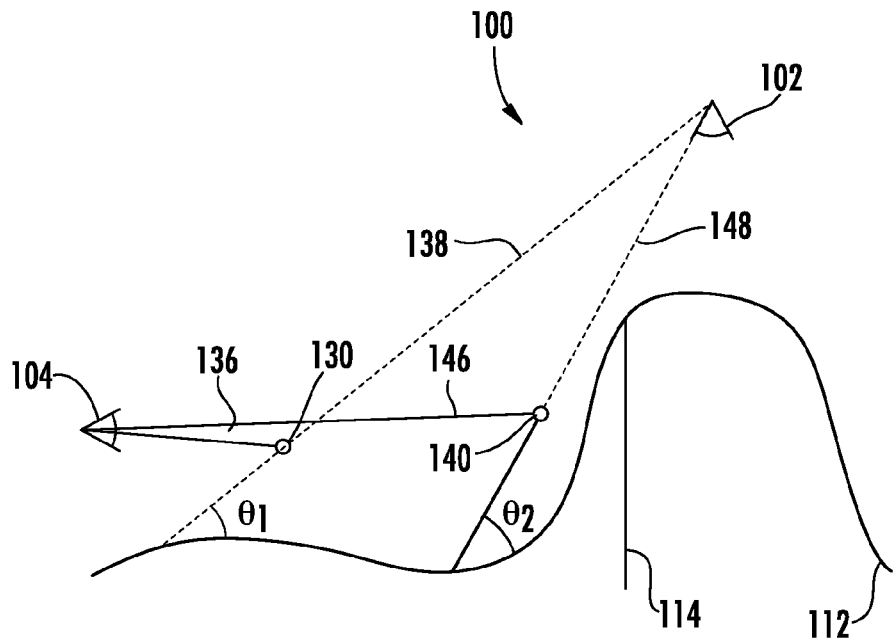
FIG. 6 depicts determining confidence weights for distance fields determined for voxels in the scene according to an exemplary embodiment of the present disclosure.

In a particular implementation, the first confidence weight for a respective voxel can be determined based on the distance between the respective voxel and the range sensor viewpoint 104 associated with the range sensor-based model 114. Voxels that are closer to the range sensor viewpoint 104 can be associated with greater first confidence weights than voxels that are further from the range sensor viewpoint 104. For instance, FIG. 6 depicts the exemplary determination of first confidence weights associated with respective voxels 130 and 140. As shown, voxel 130 is located a distance 136 from the range sensor viewpoint 104. Voxel 140 is located a greater distance 146 from the range sensor viewpoint 104. The first confidence weight associated with the voxel 130 can be greater than the first confidence weight 140 because the voxel 130 is located closer to the range sensor viewpoint 104.

The first confidence weights associated with the first distance values can be determined in other suitable manners. For instance, the first confidence weights for voxels within a certain threshold distance from the range sensor viewpoint 104 can be substantially identical. First confidence weights for voxels that are located greater than the threshold distance from the range sensor viewpoint 104 can be gradually tapered as a function of distance from the range sensor viewpoint 104.

The first distance field, including first distance values and first confidence weights, can also be propagated for voxels that are not within the extended margin 125 but satisfy other criteria. For instance, the first distance field can be propagated for voxels within a threshold distance below or within the range sensor-based model 114. For instance, as shown in FIG. 5, voxel 150 is not located in the extended margin. The voxel 150, however, is located within a threshold distance below the range sensor-based model 114. A first distance value 152 can be determined for the voxel 150. The first distance value 152 is the distance from the voxel 150 to the range sensor-based model 114 along a ray extending toward the range sensor viewpoint 104. The first distance value 152 can be a positive distance value to signify that the voxel is located below or within the range sensor-based model 114. A first confidence weight can also be associated with the voxel 150.

Referring back to FIG. 2 at (206), the method includes propagating a second distance field based on the camera-based model 112. The second distance field can provide a signed weighted distance value for selected voxels in the voxel grid. The signed weighted distance value can include a second distance value as well as a second confidence weight associated with the second distance value. The second distance field can be propagated for voxels that are within a predefined threshold distance from the camera-based model 112 as is typical in volumetric merging techniques. In addition, the second distance field can be propagated for voxels in the extended margin 125 between the range sensor-based model 114 and the range sensor viewpoint 104.

In particular, a second distance value can determined for respective voxels. The second distance value represents the distance between the respective voxel and the camera-based model 112 along a perspective associated with the camera-based model 112. In particular, the second distance value for a respective voxel can be measured along a ray from the respective voxel directly towards or directly away from the camera viewpoint 102.

For instance, FIG. 5 depicts the exemplary determination of a second distance value for respective voxel 150 located within a threshold distance of the camera-based model 112. In particular, a second distance value 154 can be determined for voxel 150. The second distance value 154 is the distance between the voxel 150 and the camera-based model 112 along a ray extending towards the camera viewpoint 102. The second distance value 154 can be a positive distance value because the voxel 150 is located within the camera-based model 112.

As further demonstrated in FIG. 5, second distance values can also be determined for exemplary respective voxels 130 and 140 located within the extended margin 125. In particular, a second distance value 134 can be determined for voxel 130. The second distance value 134 is the distance between the voxel 130 and the camera-based model 112 along a ray extending directly away from the camera view point 102. The second distance value 132 can be a negative distance value because the voxel 130 is located outside the camera-based model 112. A second distance value 144 can be determined for voxel 140. The second distance value 144 is the distance between the voxel 140 and the camera-based model 112 along a ray extending directly away from the camera viewpoint 102. The second distance value 144 can be a negative distance value because the voxel 140 is located outside the camera-based model 114.

Second confidence weights can also be determined for the respective voxels. The second confidence weights can be used in the determination of a cumulative distance field as will be discussed in more detail below. The second confidence weights can estimate the quality of the second distance values for the respective voxels. Generally, a more direct, normal view of the feature will have a better quality than a more tangential view of the feature. In that regard, the second confidence weight associated with a voxel can indicate a degree to which a perspective associated with the camera viewpoint 102 for the camera-based model 112 is oriented to face the voxel.

In one example, the second confidence weight for a respective voxel can be computed based at least in part on an angle between the camera-based model 112 and the vertical or based at least in part on the angle between the camera-based model 112 and a ray extending along a perspective of the camera viewpoint 102 towards the respective voxel. The greater the angle between the camera-based model 112 and the ray, the greater the second confidence weight associated with the respective voxel.

For instance, FIG. 6 depicts the exemplary determination of second confidence weights for respective voxels 130 and 140 in the extended margin 125. As shown, voxel 130 is associated with angle $\theta_1$ between the camera-based model 112 and a ray 138 extending from the camera viewpoint 102 towards the voxel 130. A second confidence weight can be associated with voxel 130 based on the size of angle $\theta_1$. Similarly, voxel 140 is associated with angle $\theta_2$ between the camera-based model 112 and a ray 148 extending from the camera viewpoint 102 towards the voxel 140. A second confidence weight can be associated with voxel 140 based on the size of angle $\theta_2$.

Other suitable techniques can be used to determine the second confidence weights associated with the respective voxels. For instance, the frequency of nearby sampling points used in the construction of the camera-based model can be used to determine second confidence weight for the respective voxels. In particular, a distance between the sampling points can be determined and used to determine the second confidence weights. The second confidence weights can also be multiplied by a score or value indicative of the confidence of the stereo reconstruction.

As discussed above, the second confidence weights for the second distance field determined based on the camera-based model 112 can be significantly less than the first confidence weights for the first distance field determined based on the range sensor-based model 114. For instance, the second confidence weights for the second distance field can be at least ten times less than the first confidence weights determined for the first distance field.

Referring back to FIG. 2 at (208), the method includes determining a cumulative distance field based on the first distance field and the second distance field. The cumulative distance field can provide a signed cumulative distance value for the plurality of voxels. The signed cumulative distance value for a respective voxel can be determined based on the first distance value and first confidence weight determined based on the range sensor-based model 114 for the respective voxel and the second distance value and the second confidence weight determined based on the camera-based model 112 for the respective voxel. For instance, the cumulative distance value for a respective voxel can be determined by taking a weighted average of the distance values for the respective voxel.

Figure 7:
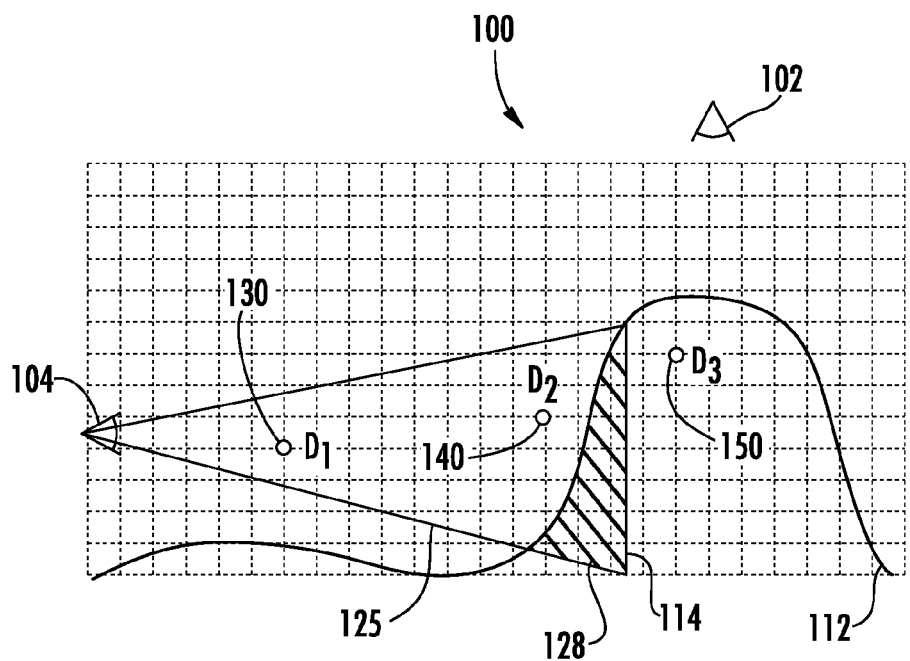
FIG. 7 depicts an exemplary cumulative distance field determined according to an exemplary embodiment of the present disclosure.

FIG. 7 depicts an exemplary cumulative distance field determined for the exemplary range sensor-based model 114 and exemplary camera-based model 112 according to an exemplary embodiment of the present disclosure. The cumulative distance field can provide cumulative distance values for voxels in the extended margin 125 in addition to voxels that are within a threshold distance of the range sensor-based model 114 or the camera-based model 112. For example, the cumulative distance field can provide a cumulative distance value $D_1$ and $D_2$ for voxels 130 and 140 in the extended margin 125. The cumulative distance field can provide a cumulative distance value $D_3$ for voxel 150 located within a threshold distance of the range sensor-based model 114.

In one embodiment, the cumulative distance value D for a respective voxel determined based on n three-dimensional models can be calculated according to the following typical exemplary weighted average formula:

$$D = \frac{\sum_{i=1}^{n} d_i w_i}{\sum_{i=1}^{n} w_i}$$

$d_i$ is the distance value determined for the ith three-dimensional model and $w_i$ is the confidence weight determined for the ith three-dimensional model.

Referring to the example illustrated in FIG. 7, the cumulative distance value $D_1$ for the voxel 130 can be calculated according to the following: $D_1 = (d_1 * w_1 + d_2 * w_2)/(w_1 + w_2)$ $d_1$ is the first distance value 132 for the voxel 130 determined based on the range sensor-based model 114. $d_2$ is the second distance value 134 for the voxel 130 determined based on the camera-based model 112. $w_1$ is the first confidence weight for the voxel 130 determined based on the range sensor-based model 114. $w_2$ is the second confidence weight for the voxel 130 determined based on the camera-based model 112. $w_1$ can be greater than $w_2$, such as at least ten times greater than $w_2$. The cumulative distance values for voxels 140 and 150 and other respective voxels can be computed in a similar manner.

Because the first confidence weights for the first distance field generated based on the range sensor-based model 114 are greater than the second confidence weights for the second distance field generated based on the camera-based model 112, the range sensor-based model 114 can be used to carve out portions of the camera-based model 112 that are located within the extended margin 125. For instance, as shown in FIG. 7, the region 128 of the camera-based model 112 that is located within the extended margin 125 can be carved out of merged three-dimensional model, providing a more accurate representation of the scene 100.

Referring back to FIG. 2 at (210), the merged three-dimensional model can be constructed based on the cumulative distance field. In particular, the merged three-dimensional model can be constructed based on the signed cumulative distance values associated with the respective voxels. The signed cumulative distance value for a respective voxel can provide the relative distance of the voxel to the merged three-dimensional model. The merged three-dimensional model can be constructed from the cumulative distance field using a meshing algorithm configured to generate a polygon mesh (e.g. a triangle mesh) from the scalar cumulative distance field. For instance, in one implementation, the merged three-dimensional model can be constructed using a dual marching cubes meshing algorithm or other suitable meshing algorithm (e.g. a poisson meshing algorithm, marching tets meshing algorithm, etc.).

Figure 8:
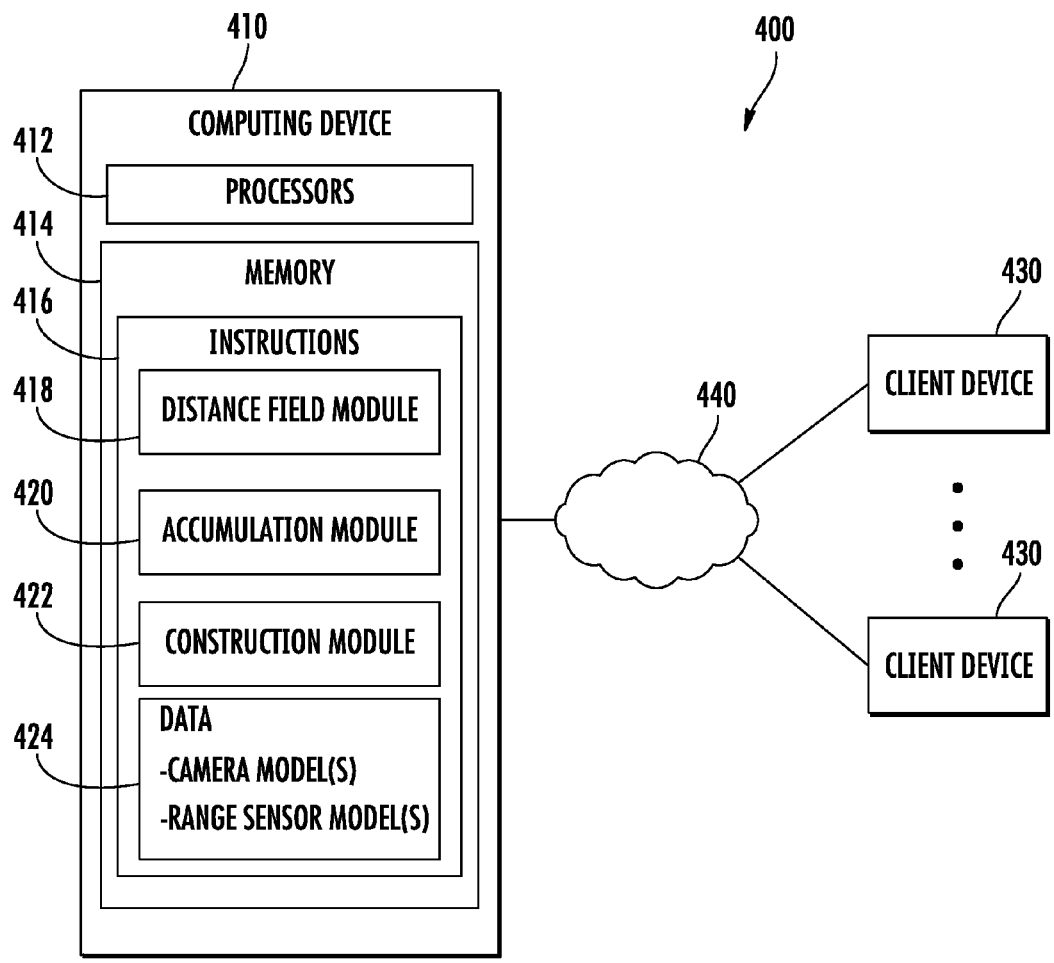
FIG. 8 depicts an exemplary computer-based system for merging three-dimensional models according to an exemplary embodiment of the present disclosure.

FIG. 8 depicts an exemplary computing system 400 that can be used to implement the methods and systems for merging three-dimensional models according to exemplary aspects of the present disclosure. The system 400 includes a computing device 410. The computing device 410 can be any machine capable of performing calculations automatically. For instance, the computing device can include a general purpose computer, special purpose computer, laptop, desktop, integrated circuit, mobile device, smartphone, tablet, or other suitable computing device. The computing device 410 can have a processor(s) 412 and a memory 414. The computing device 410 can also include a network interface used to communicate with one or more remote computing devices (e.g. client devices) 430 over a network 440. In one exemplary implementation, the computing device 410 can be a server, such as a web server, used to host a geographic information system, such as the Google Maps™ and/or the Google Earth™ geographic information systems provided by Google Inc.

The processor(s) 412 can be any suitable processing device, such as a microprocessor, microcontroller, integrated circuit, or other suitable processing device. The memory 414 can include any suitable computer-readable medium or media, including, but not limited to, RAM, ROM, hard drives, flash drives, or other memory devices. The memory 414 can store information accessible by processor(s) 412, including instructions 416 that can be executed by processor(s) 412. The instructions 416 can be any set of instructions that when executed by the processor(s) 412, cause the processor(s) 412 to provide desired functionality. For instance, the instructions 416 can be executed by the processor(s) 412 to implement a distance field module 418, an accumulation module 420, and a construction module 422.

The distance field module 418 can be configured to generate distance fields for a range sensor-based model and a camera-based model to be merged into a merged three-dimensional model according to exemplary aspects of the present disclosure. For instance, the distance field module 418 can generate a first distance field based on a range sensor-based model. The first distance field can be propagated for voxels in an extended margin between the range sensor-based model and a range sensor viewpoint associated with the range sensor-based model. The first distance field can provide a first distance value and a first confidence weight for voxels in the extended margin and for other voxels, such as voxels within a predefined distance of the range sensor-based model. The first distance value for a respective voxel can be, for instance, the distance from the respective voxel to the range sensor-based model along a perspective defined by the range sensor viewpoint. The first confidence value can be determined, for instance, based on the distance between the range finder viewpoint and the respective voxel.

The distance field module 418 can be further configured to generate a second distance field based on a camera-based model. The second distance field can also be propagated for voxels in the extended margin between the range sensor-based model and the range sensor viewpoint. The second distance field can provide a second distance value and a second confidence weight for voxels in the extended margin and for other voxels, such as voxels within a predefined distance of the camera-based model. The second distance value for a respective voxel can be, for instance, the distance from the respective voxel to the camera-based model along a perspective defined by a camera viewpoint associated with the camera-based model. The second confidence value can be determined, for instance, based on an angle between the camera-based model and a ray extending along a perspective defined by the camera viewpoint toward the respective voxel. The distance field module 418 can propagate other distance fields for other three-dimensional models to be merged according to exemplary aspects of the present disclosure.

The accumulation module 420 generates a cumulative distance field based on the distance fields propagated by the distance field module 418. For instance, the accumulation module 420 can generate a cumulative distance field based on the first distance field and the second distance field generated by the distance field module 418. In particular, the accumulation module 420 can determine a cumulative distance value for a respective voxel based on the distance values and confidence weights associated with the respective voxel.

The construction module 422 can be configured to construct the merged three-dimensional model from the cumulative distance field generated by the accumulation module 420. For instance, the construction module 422 can implement a meshing algorithm, such as a dual marching cubes meshing algorithm or other suitable meshing algorithm (e.g. a poisson meshing algorithm, marching tets meshing algorithm, etc.), to generate the merged three-dimensional model from the cumulative distance field.

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, hard disk or optical or magnetic media.

Memory 414 can also include data 424 that can be retrieved, manipulated, created, or stored by processor(s) 412. For instance, memory 414 can store data 424 associated with camera-based model(s), range sensor-based model(s), and other models to be merged into a three-dimensional model. The data 424 can also data associated with one or more distance fields and merged three-dimensional models constructed according to exemplary aspects of the present disclosure. The data 424 can be stored in one or more databases. The one or more databases can be connected to the computing device 410 by a high bandwidth LAN or WAN, or can also be connected to computing device 410 through network 440. The one or more databases can be split up so that it is located in multiple locales.

The computing device 410 can exchange data with one or more client devices 430 over the network 440. Although two clients are illustrated in FIG. 4, any number of clients 430 can be connected to the computing device 410 over the network 440. The client devices 430 can be any suitable type of computing device, such as a general purpose computer, special purpose computer, laptop, desktop, integrated circuit, mobile device, smartphone, tablet, or other suitable computing device. Responsive to a request for information, the computing device 410 can encode data in one or more data files and provide the data files to the client devices 430 over the network 440.

The network 440 can be any type of communications network, such as a local area network (e.g. intranet), wide area network (e.g. Internet), or some combination thereof. The network 440 can also include a direct connection between a client device 430 and the computing device 410. In general, communication between the computing device 410 and a client device 430 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for constructing a merged three-dimensional model, comprising:
   determining, with one or more processing devices, a first distance value for each of a plurality of voxels in an extended margin, the first distance value determined based at least in part on a range sensor-based model constructed from range sensor data, the extended margin extending between the range sensor-based model and a range sensor viewpoint associated with the range sensor-based model;

determining, with the one or more processing devices, a second distance value for each of the plurality of voxels in the extended margin and for a plurality of voxels within a threshold distance of a camera viewpoint, the second distance value being determined based at least in part upon a camera-based model constructed from imagery captured by a camera;

determining, with the one or more processing devices, a cumulative distance value for each of the plurality of voxels in the extended margin, the cumulative distance value for a respective voxel in the plurality of voxels being determined based at least in part on the first distance value associated with the respective voxel and the second distance value associated with the respective voxel; and constructing, with the one or more processing devices, a merged three-dimensional model based at least in part on the cumulative distance value for each of the plurality of voxels such that gaps in the range sensor-model are filled at least in part by the camera-based model;

wherein the cumulative distance value for the respective voxel is determined based at least in part on a first confidence weight associated with the first distance value for the respective voxel and a second confidence weight associated with the second distance value for the respective voxel, the first confidence weight being greater than the second confidence weight, wherein the first confidence weight is determined based at least in part on a distance from the respective voxel to the range sensor viewpoint.

2. The computer-implemented method of claim 1, wherein the first distance value associated with the respective voxel is a distance from the respective voxel to the range sensor-based model along a perspective defined by the range sensor viewpoint.

3. The computer-implemented method of claim 1, wherein the second distance value associated with the respective voxel is a distance from the respective voxel to the camera-based model along a perspective defined by a camera viewpoint associated with the camera-based model.

4. The computer-implemented method of claim 1, wherein the first confidence weight is at least ten times greater than the second confidence weight.

5. The computer-implemented method of claim 1, wherein the second confidence weight is determined based on an angle between the camera-based model and a ray extending along a perspective defined by a camera viewpoint associated with the camera-based model toward the respective voxel.

6. The computer-implemented method of claim 1, wherein the merged three-dimensional model is constructed using a meshing algorithm.

7. The computer-implemented method of claim 1, wherein a resolution associated with the range sensor-based model is greater than a resolution associated with the camera-based model.

8. The computer-implemented method of claim 7, wherein a resolution of the plurality of voxels corresponds to the resolution of the range sensor-based model.

9. The computer-implemented method of claim 1, wherein the range sensor data is acquired from a laser range sensor from a perspective at or near a ground level.

10. The computer-implemented method of claim 1, wherein the camera-based model is a stereo reconstruction generated from aerial imagery.

11. The computer-implemented method of claim 1, wherein the merged three-dimensional model is associated with a streetscape.

12. A computing system for merging a range sensor-based model constructed from range sensor data and a camera-based model constructed from images captured by a camera, the computing system comprising one or more processors and at least one memory, the one or more processors configured to execute computer-readable instructions stored in the at least one memory to implement a plurality of modules, the plurality of modules comprising:

a distance field module implemented by the one or more processors, the distance field module configured to generate a first distance field based at least in part on a range sensor-based model, the first distance field providing a first distance value for a plurality of voxels in an extended margin extending between the range sensor-based model and a range sensor viewpoint associated with the range sensor-based model, the distance field module further configured to generate a second distance field based at least in part on a camera-based model, the second distance field providing a second distance value for the plurality voxels in the extended margin, the second distance field sampled at a resolution associated with the range sensor-based model to accommodate a resolution disparity between the range sensor-based model and the camera-based model;

an accumulation module implemented by the one or more processors, the accumulation module configured to generate a cumulative distance field based on the first distance field and the second distance field; and a construction module implemented by the one or more processors, the construction module configured to construct a merged three-dimensional model from the cumulative distance field;

wherein the accumulation module is configured to determine the cumulative distance value for the respective voxel based at least in part on a first confidence weight associated with the first distance value for the respective voxel and a second confidence weight associated with the second distance value for the respective voxel, the first confidence weight being at least ten times greater than the second confidence weight.

13. The computing system of claim 12, wherein the accumulation module determines a cumulative distance value for a respective voxel in the plurality of voxels based on the first distance value and the second distance value associated with the respective voxel.

14. A computer-implemented method of merging a range sensor-based model constructed from range sensor data associated with a streetscape and a camera-based model constructed from aerial imagery captured by a camera to construct a merged three-dimensional model of a geographic area, the method comprising:

determining, with one or more processing devices, a first distance field based at least in part upon a range sensor-based model, the range sensor model associated with a first resolution, the first distance field providing a first weighted distance value for a plurality of voxels in an extended margin, the extended margin extending between the range sensor-based model and a range sensor viewpoint associated with the range sensor-based model;

determining, with the one or more processing devices, a second distance field based upon a camera-based model, the camera-based model associated with a second resolution, the second resolution being different from the first resolution, the second distance field providing a second weighted distance value for the plurality of voxels in the extended margin, the second distance field sampled at the first resolution to accommodate a resolution disparity between the first resolution and the second resolution;

determining, with the one or more processing devices, a cumulative distance field providing a cumulative distance value for the plurality of voxels in the extended margin, the cumulative distance value for a respective voxel in the extended margin being determined based at least in part on the first weighted distance value associated with the respective voxel and the second weighted distance value associated with the respective voxel; and constructing, with the one or more processing devices, a merged three-dimensional model from the cumulative distance field;

wherein the first weighted distance value is associated with a first confidence weight that is greater than a second confidence weight associated with the second distance value;

wherein the first confidence weight is at least ten times greater than the second confidence weight.

* * * * *